C. ZINOW.
ELECTRIC CORD HOLDER.
APPLICATION FILED MAR. 26, 1920.
1,365,762.
Patented Jan. 18, 1921.
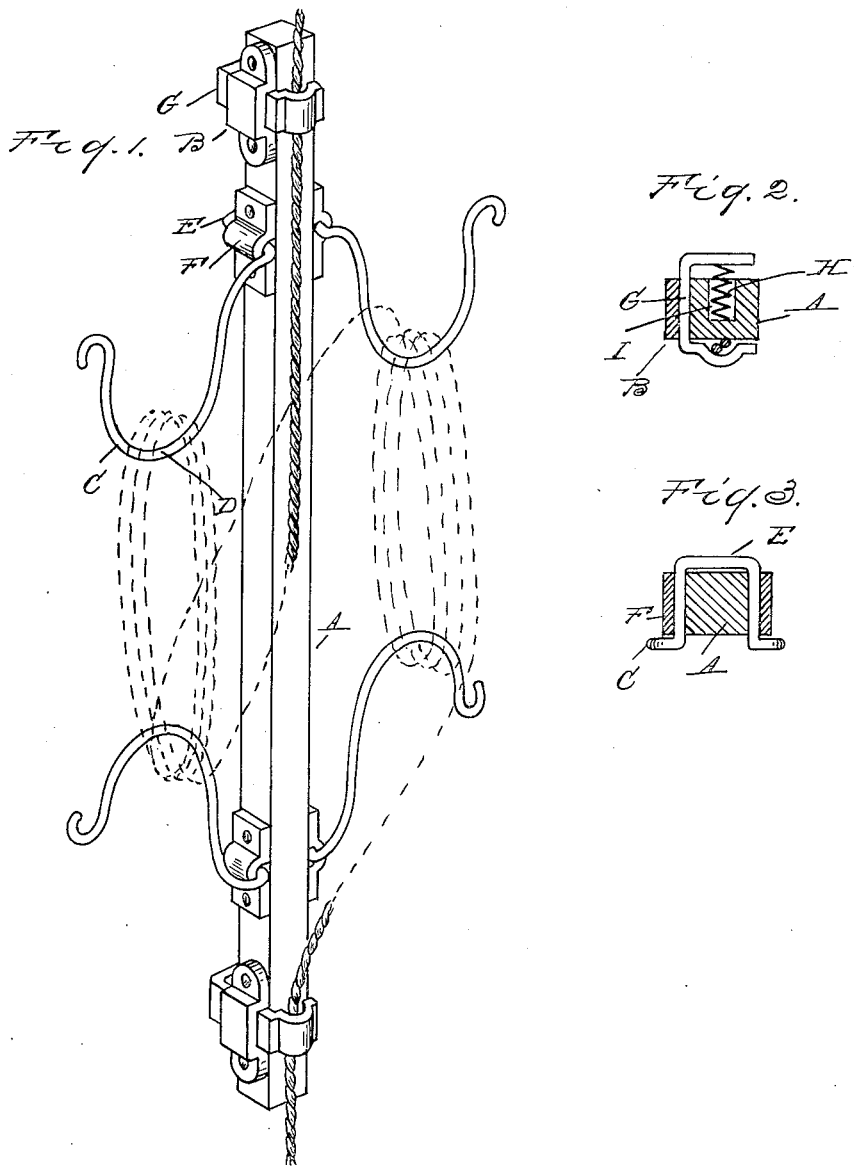

UNITED STATES PATENT OFFICE.

CHARLES ZINOW, OF OXFORD, MICHIGAN.

ELECTRIC CORD-HOLDER.

1,365,762.　　　　　Specification of Letters Patent.　　Patented Jan. 18, 1921.

Application filed March 26, 1920. Serial No. 369,045.

*To all whom it may concern:*

Be it known that I, CHARLES ZINOW, a citizen of the United States of America, residing at Oxford, in the county of Oakland and State of Michigan, have invented certain new and useful Improvements in Electric Cord-Holders, of which the following is a specification, reference being had therein to the accompanying drawings.

The invention relates to devices designed for use in connection with drop cords and extension cords for electric lights, and it is the object of the invention to obtain a construction on which the surplus cord may be quickly wound, so as to shorten the same to the required length. To this end the invention consists in the construction as hereinafter set forth.

In the drawings:

Figure 1 is a perspective view of the device;

Fig. 2 is a section through the clamp; and

Fig. 3 is a section in the plane of the securing means for one of the arms.

In the installation of electric drop cords, it is usual to make the same of greater length than required for ordinary use and to loop up the surplus cord to arrange the lamp in the desired position. Many constructions of fastening devices for holding the looped cord have heretofore been devised, but there are various objections to these, such as injury to the insulation of the cord by the clamping means, difficulty in manipulation, or insecurity in the fastening. With the present construction I have provided a simple and inexpensive construction which may be quickly attached to the cord and on which the surplus cord may be quickly wound without injury thereto or any danger of accidental disengagement.

In detail, A is a longitudinally extending member which is detachably secured to the cord by clamps B, adjacent to opposite ends thereof. C are arms projecting laterally from the member A at opposite ends thereof and upon which the surplus cord is wound. The arms C are preferably of the form shown having the inwardly extending loop portions D therein, which permit the slipping off of the cord when wound thereon. As shown, the arms are formed of bent wire having a central loop E passing around the member and secured thereto by fasteners F. The member A may be formed of any suitable material, but as shown, it is a strip of wood of rectangular cross-section, to which the fasteners F and clamps B are secured. The clamp B as specifically shown comprises a strap G nailed or otherwise fastened to the wood, the clip proper being in the form of a U-shaped member with its central portion passing beneath the strap. A spring H engaging a recess I in the member A and bearing against one side of the clamp will place the required tension thereon. The opposite side of the clamp is fashioned to embrace the cord and press the same against the side of the member A.

With the construction as shown the device may be quickly attached to the cord at any desired height by means of the upper clamp B. The operator can then reel the surplus cord upon the arms C and to hold the device in balance, the cord is reeled partly upon one side and partly upon the other side of the member A. The cord is then secured to the lower clamp B, so that the balance of the cord will be in alinement with the portion above the upper clamp. The device is also very useful in connection with the extension cords, as it will provide for the reeling of a great length of cord thereon.

What I claim as my invention is:

1. The combination with a member, of a pair of clamps thereon in spaced relation each consisting of a strip bent to conform to the member which it embraces, slidably mounted in a clip secured to the member with a spring in compression between one arm of the strip and the member for forcing the other arm yieldingly against the member, and a pair of brackets between the clamps each comprising a bar or wire bent between its ends to form oppositely extending arms connected by a body portion conforming to the member which it embraces and a pair of clips securing the body portion of the bracket to the member.

2. The combination with an elongated member provided near its ends with clamps each consisting of a strip bent to conform to and embrace the member and secured by a clip embracing the mediate portion of the strip secured to the member, and a spring between one arm of the strip and the member for forcing the opposite arm yieldingly against the member, and a pair of oppositely disposed brackets between the clamps each consisting of a pair of oppositely arranged clips secured to the member and a wire or rod bent between the ends thereof into oppositely extending arms connected by a body portion passing through the clips and conforming to the member which it embraces.

In testimony whereof I affix my signature.

CHARLES ZINOW.